Oct. 7, 1930.                    A. P. LOFSTRAND                    1,777,698
                            AMPHIBIAN MOBILE CARRIER
                     Filed April 25, 1929            2 Sheets-Sheet 1
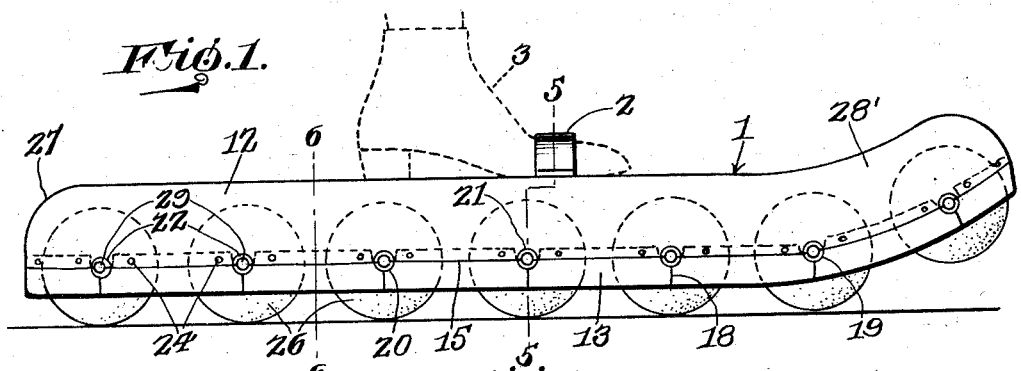
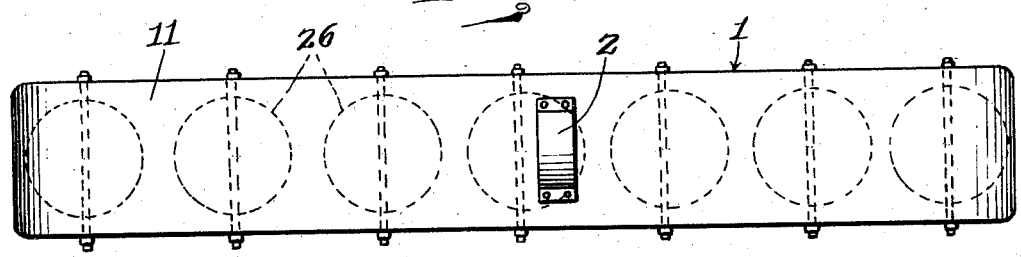
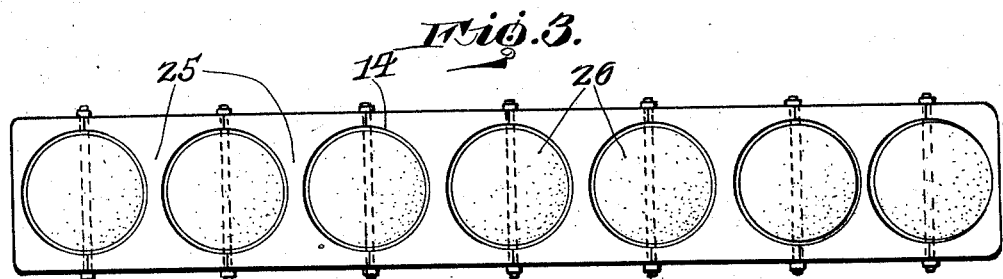
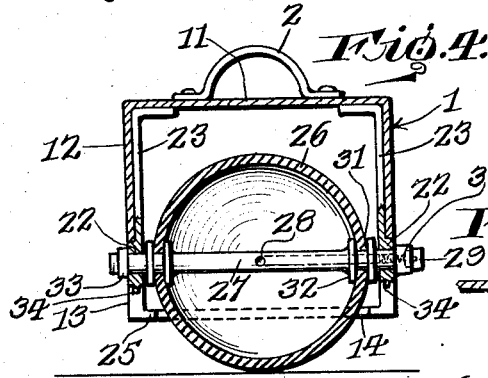
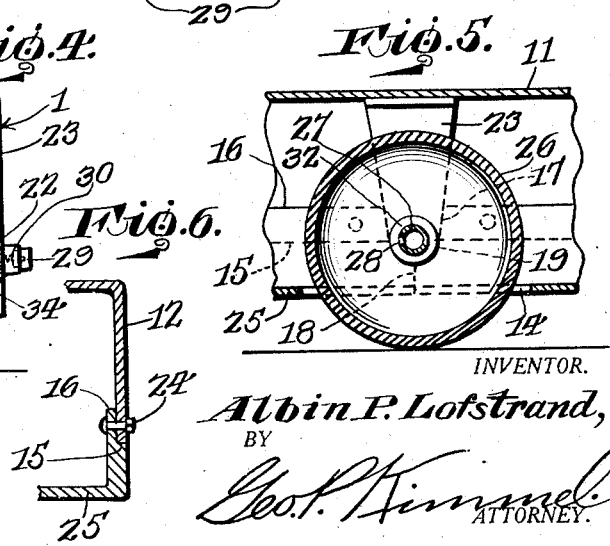
INVENTOR.
Albin P. Lofstrand,
BY
Geo. P. Kimmel
ATTORNEY.

Oct. 7, 1930.  A. P. LOFSTRAND  1,777,698
AMPHIBIAN MOBILE CARRIER
Filed April 25, 1929   2 Sheets-Sheet 2

INVENTOR.
Albin P. Lofstrand,
BY
Geo. P. Kimmel
ATTORNEY.

Patented Oct. 7, 1930

1,777,698

UNITED STATES PATENT OFFICE

ALBIN P. LOFSTRAND, OF CHICAGO, ILLINOIS

AMPHIBIAN MOBILE CARRIER

Application filed April 25, 1929. Serial No. 358,073.

This invention relates to an amphibian mobile carrier, and has for its object to provide, in a manner as hereinafter set forth, a new, novel, durable, strong and compact mobile carrier capable of being efficiently employed as a ski in summer time and further readily adaptable for use as a landing gear for aeroplanes, but although an amphiban mobile carrier, in accordance with this invention, is primarily designed for the usages as referred to, yet it is to be understood that it may be employed for any purposes for which it is found applicable.

A further object of the invention is to provide, in a manner as hereinafter set forth, a device of the class referred to, including a series of spaced, independent, inflatable, rotatable sustaining elements for the body portion of the carrier and with such elements capable of traveling on the ground or through water, under such conditions providing an amphibian mobile carrier for supporting and transporting human beings when skiing or other objects connected to and arranged in superposed relation with respect to the body portion of the carrier.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of an amphibian mobile carrier, in accordance with this invention, showing the adaptation thereof as a ski.

Figure 2 is a top plan view of the carrier.

Figure 3 is an inverted plan view.

Figure 4 is a cross sectional view.

Figure 5 is a fragmentary view in longitudinal section.

Figure 6 is a section on line 6—6, Figure 1.

Figure 7:
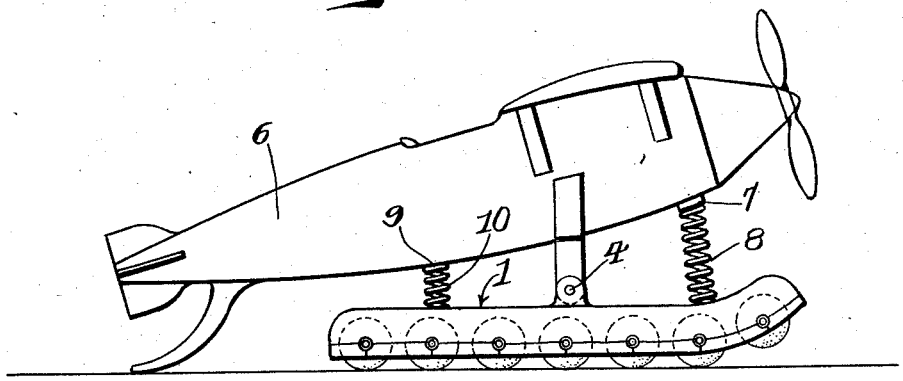
Figure 7 is a side elevation of an aeroplane and illustrating a landing gear formed from carriers in acordance with this invention.

Referring to the drawings the carrier is illustrated as including a housing referred to generally at 1 and having its top provided with any suitable means for connecting the carrier with what is to be supported thereby. In Figures 1 to 4 the connecting means is indicated at 2 and is of a form for connecting the foot 3 of a person to the carrier when the latter is used as a ski.

Figure 8:
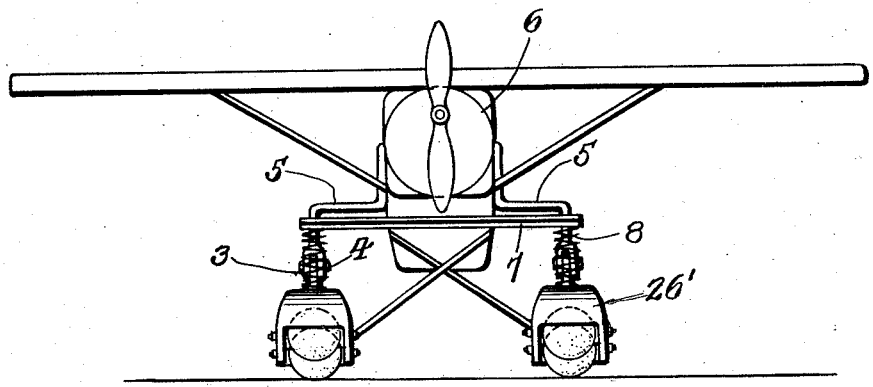
Figure 8 is a front view of an aeroplane showing the adaptation therewith of a landing gear formed from amphibian mobile carriers in accordance with this invention.

In Figures 7 and 8 the housing 1 is shown as having its top provided with an upstanding lug 3 for pivotally connecting therewith as at 4 the lower portion of an angle-shaped arm 5 which has its upper portion secured to one of the sides of the fuselage 6 of an aeroplane. When this type of carrier is used in connection with the landing gear of an aeroplane and as shown the landing gear will consist of a pair of mobile carriers, a pair of oppositely extending, angle-shaped arms 5 each arranged in a manner as heretofore referred to, a bar 7 secured to the bottom of the fuselage 6, extending transversely with respect thereto and projecting laterally from each side thereof and arranged forwardly with respect to the lugs 3 on the carriers, a pair of coiled springs 8 interposed between the ends of the bar 7 and the carriers, as well as being suitably connected therewith, a bar 9 secured to and extending transversely with respect to the bottom of the fuselage 6, projecting laterally from each side thereof and having interposed between the ends thereof and the carriers the coiled springs 10, which are suitably connected to the bar 9 and to the carriers.

The housing 1 of the carrier comprises a top wall 11, a pair of side walls formed of an upper continuous portion 12 and a lower portion formed of a series of abutting, yoke-shaped sections 13 each having its bottom provided with an opening 14. The outer face of each vertical part of a section 13 is shouldered as at 15 to provide a seat and a reduced upper part 16. Each end of each side of each intermediate section 13 has the upper portion thereof inclined as at 17, a vertically disposed lower portion 18 extended beyond the inclined upper portion 17 and a curved, intermediate portion 19 which extends from the lower end of the portion 17 and merges into the upper end of the portion 18. By this arrangement each end edge of each side of each intermediate section 13 has an upper inclined portion, a vertically disposed lower portion and a curved intermediate portion.

The curved intermediate portions of the opposed ends of the sections 13 provide a semicircular seat 19, see Figure 1. The end sections 13 have their outer ends squared and their inner ends provided with the portions 17, 18 and 19. The bottom edge of the upper portion 12 of each side of the housing 1 is formed with spaced, semi-circular notches 21 which coact with the semi-circular seat 20 to provide a circular opening for the reception of a cylindrical bearing 22, which is integral with the lower end of a strap 23, the latter being secured to the inner face of the upper portion 12 of each side of the housing and to the inner face of the top 11 of the housing. The bearings 22 are flush with the outer faces of the upper portions 12 of the sides and the sections 13 of the sides. The upper portions 12 of the sides of the housing are mounted against the shoulders 15 and the reduced upper portions 16 of the sections 13 abut against the inner faces of the portions 12 of the housing sides. The portions 12 of the housing sides and the sections 13 are detachably connected together by holdfast devices 24. The bottoms 25 of the yoke-shaped sections 13 abut and provide the bottom of the housing 1.

The ends of the housing are not as high as the sides thereof and the manner in which each end of the housing is set up is indicated at 26' in Figure 8. The upper corners of the housing are rounded as indicated at 27, Figure 1. The forward portion of the housing is upturned in a curvilinear manner as indicated at 28', Figure 1.

Carried by the housing is a series of rotatable, sustaining units which depend from the bottoms 25 of the sections 13 and extend through the opening 14 formed in said bottoms 25. Each of the units is inflatable and rotatable. The units depend a sufficient distance below the housing 1 for the purpose of maintaining it in spaced relation with respect to the surface over which the carrier is travelling.

Each sustaining unit comprises an inflatable, resilient body 26 preferably in the form of a hollow sphere, but such body 26 can be of any form desired and it is fixedly secured to a rotatable shaft 27 journaled in and projecting from a pair of opposed bearings 22. The shaft 27 is hollow for a portion of its length to provide a compressed air conduit which opens through the port 28 into the interior of the body 26. One end of the shaft 27 has secured thereto an inlet valve device 29 of known construction and which opens into the conduit provided by the shaft. A stop nut 30 is carried by that end of the shaft 27 to which valve 29 is attached and nut 30 abuts against the outer end of a bearing 22. The body 26 is formed with a pair of diametrically disposed openings 31 for the passage of the shaft 27 and the latter is formed with two spaced pairs of spaced flanges 32 between which the material of the body 26 is clamped. That portion of the material of the body 26 which is clamped between the flanges 32 is the portion thereof bearing on the openings 31. This sets up an air tight seal between the body 26 and the shaft 27 which is due to the resiliency of body 26.

The other end of the shaft 27 has connected therewith a removable, combined securing and retaining nut 33 for the shaft and which abuts against the outer end of the other bearing 22. The nuts 30, 33 in connection with the outer flanges 31 prevent the transverse shifting of the shaft 27 with respect to the housing 1. The openings 14 formed in the bottoms 25 of the yoke-shaped sections 13 are of a size as not to retard or cramp in any manner the body 26 during the travel thereof. The bottoms 25 of the sections 13 act as a closing means for the bottom of the housing between the openings 14. The openings 14 will conform to the shape of the body 26 when the latter is inflated and as shown the openings 14 are circular in form due to the fact that the bodies 26 are of spherical contour. The bodies 26 are inflated by connecting the valves 29 with a suitable source of compressed air and on a supply of the latter it will pass through the ports 28 and inflate the bodies 26 and when inflated the bodies 26 will possess the characteristic of a float.

The yoke-shaped sections 13 are detachable to permit of access to be had to the interior of the housing 1 if a sustaining unit becomes damaged to enable a new unit to be substituted therefor. Each bearing 22 is formed of two sections and its lower section is formed with a semi-circular flange 34 which seats in the portion 19 of a section 13. The portion 19 is provided with a groove to receive the flange 34. See Figure 4.

It is thought the many advantages of an amphibian mobile carrier in accordance with this invention can be readily understood, and although one embodiment of the invention will be as illustrated and described, it is to be understood that changes can be had in such embodiment which will fall within the scope of the invention as claimed.

What I claim is:

1. An amphibian mobile carrier comprising a housing including a top, bottom and a pair of sides, said bottom formed with closely arranged, spaced openings, and a row of spaced, closely arranged, hollow, spherical, rotatable sustaining elements journaled at the diametric center thereof in said sides and each including a resilient, inflatable, rotatable body having a part thereof depending from said bottom through said openings.

2. An amphibian mobile carrier comprising a housing including a top, a bottom and a pair of sides, said bottom formed with closely arranged, spaced openings, and a row of spaced, closely arranged, hollow, spherical, rotatable sustaining elements journaled at the diametric center thereof in said sides and each including a resilient, inflatable, rotatable body having a part thereof depending from said bottom through said openings, said top having extended upwardly therefrom means for connecting the housing to an object to be supported by the carrier.

3. An amphibian mobile carrier comprising a housing, and a series of spaced, closely arranged, hollow, spherical sustaining units supported thereby and depending therefrom and each including a resilient, inflatable body and a rotatable shaft extending diametrically of said body and anchored therewith, said shaft journaled in the sides of the housing and including normally closed valve controlled means opening into said body and adapted to communicate with an air supply for inflating said body.

4. An amphibian mobile carrier comprising a housing, a series of spaced, closely arranged, hollow, spherical sustaining units supported thereby and depending therefrom and each including a resilient, inflatable body and a rotatable shaft extending diametrically of said body and anchored therewith, said shaft journaled in the sides of the housing and including normally closed valve controlled means opening into said body and adapted to communicate with an air supply for inflating said body, and said housing having means to permit of the independent removal of each of said units.

5. An amphibian mobile carrier comprising a housing including a top, a bottom and a pair of sides, said bottom formed with closely arranged openings, and a row of spaced, closely arranged, hollow, sustaining units journaled at the diametrical center thereof in the sides of the housing and each including a resilient, inflatable, rotatable body having a part thereof depending through an opening in said bottom, and said housing having one end thereof extending upon an upwardly directed curve.

6. An amphibian mobile carrier comprising a housing including a top, a bottom and a pair of sides, said bottom formed with closely arranged openings, and a row of spaced, closely arranged, hollow, sustaining units journaled at the diametrical center thereof in the sides of the housing and each including a resilient, inflatable rotatable body having a part thereof depending through an opening in said bottom, said housing having one end thereof extending upon an upwardly directed curve, said housing including means to permit of the independent removal of each of said units.

7. An amphibian mobile carrier comprising a housing of materially greater length and width and having one end thereof extending upon an upwardly directed curve, said housing including a top, a bottom and a pair of sides, said top having extended therefrom means for connecting the housing to the object to be supported by the carrier, said housing having its bottom formed with closely arranged, spaced openings, a plurality of spaced, closely arranged, hollow sustaining units each including a shaft journaled in the sides of said housing and further including a resilient, inflatable, floatable member having a part thereof extending from the bottom of the housing through an opening, and each of said shafts having valve controlled means to provide for the inflation of the resilient member carried thereby.

8. An amphibian mobile carrier comprising a housing including a top, a bottom and a pair of sides, said bottom having closely arranged openings, said sides provided with aligning openings, bearings mounted in said aligning openings, and a plurality of spaced, closely arranged, hollow, rotatable sustaining units each provided at the diametrical centers with shafts journaled in the aligning bearings and projecting from the sides of the housing, each of said units being inflatable and having a part thereof depending from the bottom of the housing through an opening in said bottom, and each of said shafts having valve controlled means accessible exteriorly of the side of the housing to provide for the inflation of the unit.

9. An amphibian mobile carrier comprising a housing including a top, a bottom and a pair of sides, said bottom having closely arranged openings, said sides provided with aligning openings, bearings mounted in said aligning openings, and a plurality of spaced, closely arranged, hollow, rotatable sustaining units each provided at the diametrical center with a shaft journaled in the aligning bearings and projecting from the sides of the housing, each of said units being inflatable and having a part thereof depending from the bottom of the housing through an opening in said bottom, each of said shafts having valve controlled means accessible exteriorly of the side of the housing to provide for the inflation of the unit, said housing provided with means to permit of the independent removal of each of said units.

In testimony whereof, I affix my signature hereto.

ALBIN P. LOFSTRAND.